United States Patent [19]

Eden et al.

[11] Patent Number: 5,023,877
[45] Date of Patent: Jun. 11, 1991

[54] MINIATURE, OPTICALLY PUMPED NARROW LINE SOLID STATE LASER

[75] Inventors: James G. Eden, Mahomet; Mark J. Kushner, Urbana, both of Ill.

[73] Assignee: The United States of America as represented by the Secretary of the Air Force, Washington, D.C.

[21] Appl. No.: 546,462

[22] Filed: Jun. 29, 1990

[51] Int. Cl.$^5$ .............................................. H01S 3/30
[52] U.S. Cl. ............................................. 372/7; 372/39
[58] Field of Search ...................................... 372/7, 39

[56] References Cited

U.S. PATENT DOCUMENTS

| | | | |
|---|---|---|---|
| 3,573,653 | 4/1971 | Smiley | 372/7 |
| 3,573,654 | 4/1971 | Smiley | 372/7 |
| 3,579,130 | 5/1971 | Smiley | 372/7 |
| 3,579,142 | 5/1971 | Smiley | 372/7 |
| 3,747,021 | 7/1973 | Smiley | 372/7 |
| 3,967,213 | 6/1976 | Yariv | 331/94.5 C |
| 4,002,998 | 1/1977 | Conwell et al. | 372/7 |
| 4,087,764 | 5/1978 | Young | 372/7 |
| 4,395,769 | 7/1983 | Damen et al. | 372/7 |
| 4,827,479 | 5/1989 | Campbell et al. | 372/5 |

Primary Examiner—Léon Scott, Jr.
Attorney, Agent, or Firm—Irwin P. Garfinkle; Donald J. Singer

[57] ABSTRACT

A miniature solid state laser is optically pumped by ultraviolet radiation produced by a surface or corona discharge. The device is monolithic in that both the optical pump and the active medium are contiguous to a base material which is optically transparent in the ultraviolet range. The disclosed device consists of a substrate, a thin metal halide or crystalline or amorphous film deposited on the bottom of the substrate and a pair of spaced electrodes on the top of the substrate. When a high voltage pulse is applied across the spaced electrodes, discharge occurs between the electrodes and produces strong ultraviolet emissions which propagate through the substrate and dissociates the metal halide molecules in the film. This causes laser emission to occur on an atomic transition of the metal atom. The active laser medium may also be a crystalline platelet or amorphous thin film containing an impurity atom or molecule (an example would be YAG doped with Nd or LiYF$_4$(YLF) doped with cerium). In this case, the active medium may provide its own mechanical support, provides a surface on which the discharge may occur and thus eliminates the need for a separate optical substrate.

27 Claims, 1 Drawing Sheet

MINIATURE, OPTICALLY PUMPED NARROW LINE SOLID STATE LASER

STATEMENT OF GOVERNMENT INTEREST

The invention described herein may be manufactured and used by or for the Government for governmental purposes without the payment of any royalty thereon.

This invention relates to miniature solid state lasers that are optically pumped by the ultraviolet (UV) radiation emitted by a surface or corona discharge. The laser is monolithic in that both the optical pump and the active laser medium are contiguous to a "base" or substrate material that is optically transparent in the visible, ultraviolet (UV) and in some cases, at least, a portion of the vacuum ultraviolet (VUV) region.

BACKGROUND OF THE INVENTION

The most relevant known background art is described in a paper by Schmiele, Luthy, Henchoz and Weber, entitled Miniaturization of a Thallium Iodide Photodissociation Laser, published in Applied Physics, Volume 29, pp. 201-3 in 1982. Schmiele et al. describe a miniature Thallium Iodide photodissociation gas laser in which the active medium was in the form of a thin layer on a quartz wall. An ArF excimer laser was used to pump the active medium in the vapor phase. The Schmiele et al. laser differs from the present invention in that it was pumped by another laser, (an ArF laser), and it used an active medium in the vapor phase.

A search of the patented background art revealed U.S. Pat. No. 3,573,653 issued to Smiley, U.S. Pat. No. 3,967,213 issued to Yariv, and U.S. Pat. No. 4,827,479 issued to Campbell et al.

Smiley discloses a tunable thin film laser consisting of laser material that is excited by a source which is described as comprising "an appropriate noncoherent light source such as a gas discharge device or alternatively a source of coherent excitation energy such as another laser." Conductive means are positioned on either side of the laser material and insulated therefrom, and a variable electric field is generated between the electrodes to provide tuning for the laser output. Yariv discloses an X-ray laser comprising a single crystal in the form of a thin film with an oriented set of prominent atomic planes so that when the crystal is excited by an appropriate pumping source, such as electrons, X-rays, or intense laser radiation, X-ray photons, which are emitted from the crystal, experience internal feedback from the atomic planes, thereby eliminating the need for external feedback. In addition, the crystal functions as a thin planar waveguide confining the X-ray waves therein, thereby reducing the necessary pumping power and increasing overall efficiency. Campbell et al. disclose an operational X-ray laser comprising a free thin foil which is optically pumped by a high power laser.

SUMMARY OF THE INVENTION

The invention claimed herein is for a miniature solid state laser comprising a thin film of a metal monohalide, such as indium monoiodide or thallium monoiodide, which is deposited onto a substrate. The device is optically pumped by the optical emission from an electrical discharge sustained between two electrodes in contact with the substrate. When a pulsed voltage is applied to the electrodes, a corona discharge results which tracks along the surface and produces strong emission in the UV and VUV. The short wavelength radiation passes through the substrate and photodisssociates the metal halide molecules on the film which causes laser emission to occur on a metal transition of the metal atom. For thallium, for example, this occurs at a wavelength of 535 nm (green) and in atomic indium at a wavelength of 451 nm (blue). The active laser medium may also be a crystalline platelet or film of a material, such as YAG doped with Nd, which is directly pumped by the optical emission from the discharge. In the case of a platelet, the substrate may no longer be necessary since the laser medium (platelet) now provides its own mechanical support.

OBJECTS OF THE INVENTION

It is an object of this invention to provide a solid state miniature laser that is optically pumped by the ultraviolet radiation emitted by a surface or corona discharge.

Another object of this invention is to provide a laser in which the optical pump and the active medium are both contiguous to a base material that is optically transparent.

Still another object of this invention is to provide a monolithic, miniature laser comprising a metal halide laser material deposited as a film on one side of a transparent base material, and a pair of electrodes on the other side for producing radiation that passes through the base material to photodissociate the molecules of the laser material to produce lasing. The active laser medium may also be a thin film or platelet of solid state laser material.

BRIEF DESCRIPTION OF THE DRAWINGS

For a more complete understanding of the objects, nature and advantages of this invention, reference should now be made to the accompanying drawings, in which.

DESCRIPTION OF THE PREFERRED EMBODIMENTS

Figure 1:
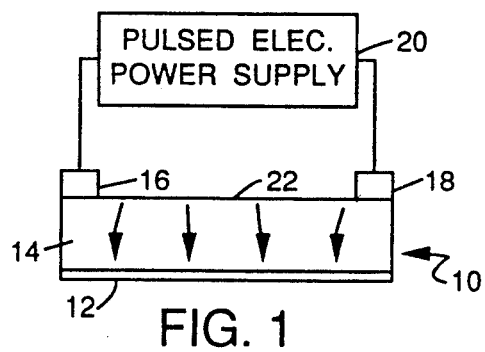
FIG. 1 is a diagrammatic representation of one embodiment of this invention.

Referring to FIG. 1, a miniaturized laser 10 comprises, a thin film 12 of a metal monohalide, such as indium monoiodide or thallium moniodide or a solid state laser material such as Nd:YAG, deposited onto a substrate 14. The substrate 14 is transparent in the visible and UV regions, down to below 200 nm. On the other side of the substrate 14 are mounted two electrodes 16 and 18 across which is connected a pulsed electrical power supply 20.

When a pulsed voltage is applied to the electrodes 16 and 18, a discharge occurs through the air or prepared gas adjacent to the substrate in the space between the electrodes. This discharge tracks along the surface 22 of the substrate 14 and produces strong emission in the UV and VUV ranges. The short wavelength radiation passes through the substrate and photodissociates the metal halide molecules in the film. This causes laser emission to occur on an atomic transition of the metal atom or in the solid state laser material. For thallium this occurs at a wavelength of 535 nm, and in atomic indium, at a wavelength of 451 nm.

Figure 2:
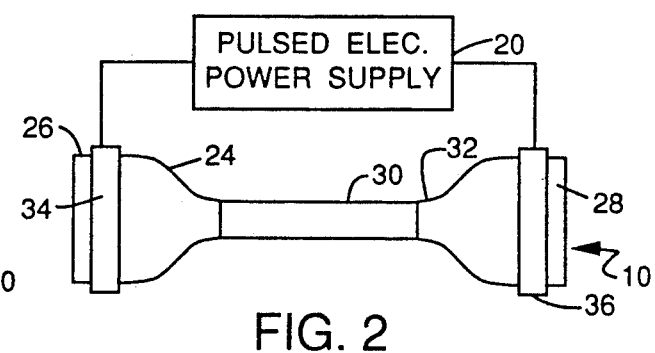
FIG. 2 is a diagrammatic representation of a second modification of this invention.

In the embodiment of FIG. 2, a laser 10 having a circular cross-section comprises a substrate 24 which is flared at its ends 26 and 28. A monohalide film material 30 is deposited on the inner surface of a central capillary portion 32, and band electrodes 34 and 36 are mounted on the exterior of the flared ends. A source 20 of voltage pulses is connected across the electrodes. With this embodiment, the surface current flux can be small at the electrode but large at the center where the active laser medium is located. It would appear that it may also be advantageous for the active medium to be in a crystalline state, such as Nd:YAG or Ti-doped sapphire which would be optically pumped in the same fashion as the metal-halides described here.

Figure 3:
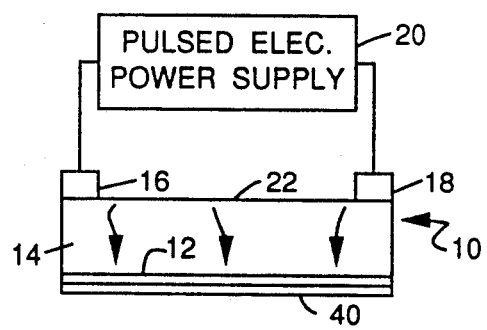
FIG. 3 is a diagrammatic representation of another modification of this invention.

In the FIG. 3 embodiment of the invention, the apparatus is similar to that shown in FIG. 1, and the same reference characters are used to denote the same components. The difference is that the embodiment of FIG. 3 adds a fluorescent converter 40 either between the substrate and the active laser material 12 or mounted on the exterior surface of the laser material, as shown in the FIG. 3. This fluorescent converter 40 improves laser efficiency by absorbing pump light that is not efficiently absorbed by the film 12, but converts the pump radiation wavelengths to a spectral region at which the laser medium does strongly absorb passes through it. That is, the absorbed energy in the converter 40 is re-emitted at wavelengths that are absorbed by the active layer.

Figure 4:
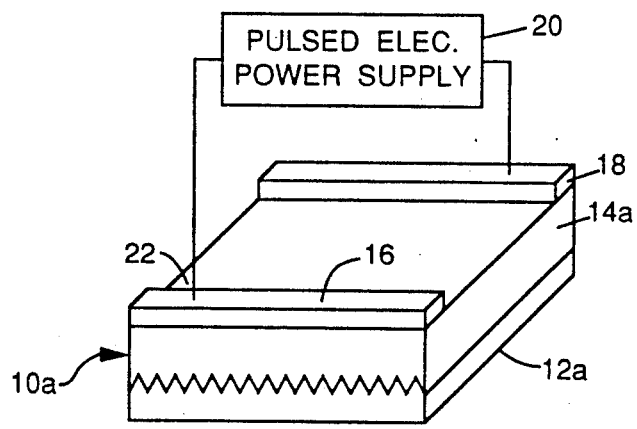
FIG. 4 is a diagrammatic representation of yet another modification of this invention.

The embodiment of FIG. 4 is also similar to the embodiment of FIG. 1, except that the lower surface of the substrate 14a is corrugated prior to applying the very thin layer of active material 12a. It is pointed out that because the layer of active material is very thin, the devices are compatible with integrated optics techniques. For example, with the surface of the substrate corrugated as in this embodiment, the laser can be operated in a distributed feedback mode without the need for mirrors. Therefore, it can be coupled to optical fibers or planar waveguides.

Although not illustrated in the embodiment of FIGS. 1-4, the surface on the discharge side of the substrate can be grooved to improve the reproducibility of the discharge and, hence, the operation of the device.

Figure 5:
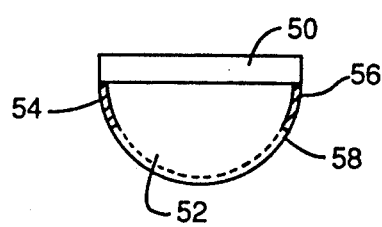
FIGS. 5 and 6 are diagrammatic representations of another modification of this invention in which the substrate is formed as a lens.
Figure 6:
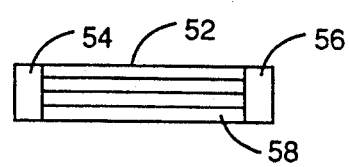

The embodiment illustrated in FIGS. 5 and 6 shows a modification of the basic idea, but in which the laser medium 50 is deposited on a substrate 52 formed as a lens. A pair of band electrodes 54 and 56 is attached to the substrate 52 and a pulsed electrical power supply (not shown in FIGS. 5 and 6) is connected across the bands. The curved surface of the substrate 52 is provided with a plurality of parallel grooves 58 to allow the discharge to be reproducible. The light produced by the various discharge grooves or "channels" is focused by the curved substrate to a line inside or at the surface of the active medium. This concentrated pump radiation will allow laser oscillations to be realized with less power delivered to the corona discharge.

The disclosed embodiments of this laser have a number of advantages. For one, the laser is in the solid state. It uses a metal halide in a solid form. Any amorphous crystalline or polycrystalline laser material is also acceptable. The disclosed laser system is compact and, except for the power supply, is self contained. The entire system can be constructed on a substrate only approximately 1 mm in length, and thus, pulsed voltages as low as 1 to 3 KV applied across the electrodes will yield electric field strengths of 10 to 30 KV per cM. These field strengths are more than enough to generate the necessary corona or surface discharge. These voltages may be generated from compact, low voltage batteries using step up coils.

It is pointed out that the layer of active material is very thin, and therefore, the devices are compatible with integrated optics techniques. For example, the surface of the substrate can be corrugated prior to applying the metal-halide or other crystalline film, and thus, this laser can be operated in a distributed feedback mode without the need for mirrors. Also, this system can be coupled to optical fibers or planar waveguides.

Another advantage is that waveguiding can be obtained in the active region, thereby reducing threshold pumping requirements.

The wavelengths obtainable using these lasers are much shorter than those realizable with III-IV semiconductor lasers. Through the proper choice of a metal halide, obtaining laser wavelengths in the UV range are quite possible. The green and violet wavelengths mentioned earlier are considerably smaller than the current state of the art in semiconductors lasers (yellow-red). Moreover, the radiation emitted by this laser is narrow in linewidth and locked to a wavelength determined by the metal atom (or impurity ion in the crystal such as Nd in YAG or Ce in YLF). This feature is extremely valuable for communications system Which require a reproducible frequency standard as a master oscillator.

Because this invention is subject to numerous variations, adaptations and improvements, it is intended that the scope of the invention be limited only by the following claims as interpreted in the light of the prior art.

What is claimed is:

1. A miniature, optically pumped, narrow line width solid state laser comprising:
    an optically transparent substrate;
    an active laser medium comprising a film of lasing material on said substrate, said laser material comprising a thin film of a metal monohalide;
    a pair of spaced electrodes on said substrate;
    a source of short duration high voltage pulses connected across said electrodes, said pulses arcing between said electrodes and producing short wavelength light energy, said light energy passing through said transparent substrate to photodissociate molecules in said film, thereby causing laser emission to occur on a transition of the metal atom, thereby producing a narrow line width laser.

2. The invention as defined in claim 1 wherein said substrate is transparent in the vacuum ultraviolet range.

3. The invention as defined in claim 1 wherein said metal monohalide is indium monoiodide.

4. The invention as defined in claim 1 wherein said metal monohalide is thallium moniodide.

5. The invention as defined in claim 1 wherein said substrate is rectangular in cross section and wherein said active medium is on one side of said substrate and said electrodes are on the opposite side of said substrate.

6. The invention as defined in claim 5 wherein said substrate is transparent in the vacuum ultraviolet range.

7. The invention as defined in claim 4 wherein said active material is indium monoiodide.

8. The invention as defined in claim 6 wherein said active material is thallium monoiodide.

9. The invention as defined in claim 1 wherein said substrate is a capillary having flared ends and a central capillary section, and wherein said active material is deposited inside the central section, and said spaced electrodes are mounted on said flared ends.

10. The invention as defined in claim 9 wherein said substrate is transparent in the ultraviolet range.

11. The invention as defined in claim 9 wherein said substrate is transparent in the vacuum ultraviolet range.

12. The invention as defined in claim 11 wherein said active material is indium monoiodide.

13. The invention as defined in claim 11 wherein said active material is thallium monoiodide.

14. A miniature solid state laser comprising:
an optically transparent substrate;
an active medium comprising a film of lasing material on said substrate;
an optical pump for driving said lasing material, said active material being a thin film of a metal monohalide, said pump comprising a pair of spaced electrodes on said substrate and a source of short duration high voltage pulses connected across said electrodes, said pulses arcing between said electrodes, the resulting arc producing short wavelength light energy, said short wavelength light energy passing through said transparent substrate to photodissociate molecules in said film thereby causing laser emission to occur on a transition of the metal atom, thereby producing a narrow line width laser.

15. The invention as defined in claim 14 wherein said substrate is transparent in the vacuum ultraviolet range.

16. The invention as defined in claim 15 wherein said active material is indium moniodide.

17. The invention as defined in claim 15 wherein said active material is thallium moniodide.

18. The invention as defined in claim 14 wherein said substrate is rectangular in cross section and wherein said active medium is on one side of said substrate and said electrodes are on the opposite side of said substrate.

19. The invention as defined in claim 14 wherein said substrate is a capillary having flared ends and a central capillary section, and wherein said active material is deposited inside the central section, and said spaced electrodes are mounted on said flared ends.

20. The invention as defined in claim 19 wherein said substrate is transparent in the vacuum ultraviolet range.

21. The invention as defined in claim 20 wherein said active material is indium moniodide.

22. The invention as defined in claim 20 wherein said active material is thallium moniodide.

23. The invention as defined in claim 14 wherein the said substrate is corrugated on said one side, and wherein said film is deposited onto such corrugations.

24. The invention as defined in claim 14 wherein said substrate is shaped as a lens for focusing light onto said active laser medium.

25. The invention as defined in claim 24 wherein said active material is indium moniodide.

26. The invention as defined in claim 24 wherein said active material is thallium moniodide.

27. The invention as defined in claim 24 wherein the surface of said lens shaped substrate is grooved.

* * * * *